United States Patent
Fritzsche et al.

(10) Patent No.: US 8,276,467 B2
(45) Date of Patent: Oct. 2, 2012

(54) TACTILE SENSOR WITH DECOUPLED SENSOR CELLS

(75) Inventors: Markus Fritzsche, Magdeburg (DE); Norbert Elkmann, Magdeburg (DE)

(73) Assignee: Fraunhofer-Gesellschaft zur Förderung der Angewandten Forschung E.V. (DE)

( * ) Notice: Subject to any disclaimer, the term of this patent is extended or adjusted under 35 U.S.C. 154(b) by 71 days.

(21) Appl. No.: 12/599,329

(22) PCT Filed: May 14, 2008

(86) PCT No.: PCT/EP2008/004027
§ 371 (c)(1),
(2), (4) Date: Oct. 29, 2010

(87) PCT Pub. No.: WO2008/138647
PCT Pub. Date: Nov. 20, 2008

(65) Prior Publication Data
US 2011/0036181 A1    Feb. 17, 2011

(30) Foreign Application Priority Data
May 14, 2007   (DE) .......................... 10 2007 022 871

(51) Int. Cl.
*G01D 7/00* (2006.01)
(52) U.S. Cl. .................................................. 73/862.046
(58) Field of Classification Search ............. 73/862.041–862.046
See application file for complete search history.

(56) References Cited

U.S. PATENT DOCUMENTS

| | | | | |
|---|---|---|---|---|
| 4,437,138 A | | 3/1984 | Nicol | |
| 4,555,954 A | * | 12/1985 | Kim | 73/862.046 |
| 4,866,412 A | * | 9/1989 | Rzepczynski | 338/114 |
| 5,060,527 A | * | 10/1991 | Burgess | 73/862.68 |
| 5,138,119 A | * | 8/1992 | Demeo | 200/5 A |
| 5,144,104 A | * | 9/1992 | Bedoya | 200/512 |
| 5,149,923 A | * | 9/1992 | Demeo | 200/5 A |
| 6,344,791 B1 | * | 2/2002 | Armstrong | 338/114 |
| 6,522,155 B2 | | 2/2003 | Pietsch et al. | |
| 6,809,529 B2 | * | 10/2004 | Okada et al. | 324/681 |
| 7,823,467 B2 | * | 11/2010 | Taya et al. | 73/862.625 |

FOREIGN PATENT DOCUMENTS

| | | |
|---|---|---|
| DE | 2514170 A1 | 10/1976 |
| DE | 30 25 362 A1 | 1/1982 |
| DE | 3446327 A1 | 6/1986 |
| DE | 4435829 A1 | 4/1996 |
| DE | 19750671 A1 | 6/1998 |
| DE | 200 14 200 U1 | 12/2000 |

OTHER PUBLICATIONS

"International Application Serial No. PCT/EP2008.004027, International Search Report and Written Opinion (German) mailed Nov. 10, 2008", 11 pgs.

"International Application Serial No. PCT/EP2008/004027, International Search Report Nov. 10, 2008", 8 pgs.

"International Application Serial No. PCT/EP2008/004027, Written Opinion of the International Searching Authority (English Translation) mailed Nov. 10, 2008", 7 pgs.

* cited by examiner

*Primary Examiner* — Max Noori
(74) *Attorney, Agent, or Firm* — Schwegman Lundberg & Woessner, P.A.

(57) ABSTRACT

The invention relates to a tactile sensor with a sensor cell, wherein a sensor cell comprises an electrically-conducting workpiece made from flexible material and a connection to a first and a second electrode and the flexible material layers the electrical conductivity thereof under mechanical load. According to the invention, pressure distributions can be measured, by providing at least two sensor cells separated by an intervening zone, wherein two adjacent sensor cells are connected to a common first or second electrode and in the intervening zone between a first and a second adjacent sensor cell the electrically conducting workpiece of the first and the second sensor cell are at least partly separated from each other by medium with a greater specific resistance than the specific resistance of the electrically conducting workpieces.

18 Claims, 9 Drawing Sheets

Fig. 5b

TACTILE SENSOR WITH DECOUPLED SENSOR CELLS

PRIORITY CLAIM TO RELATED APPLICATIONS

This application is a national stage application under 35 U.S.C. §371 of PCT/EP2008/004027, filed May 14, 2008, and published as WO 2008/138647A2 on Nov. 20, 2008, which claims priority to German Application No. 10 2007 022 871.8, filed May 14, 2007, which applications and publication are incorporated herein by reference and made a part hereof in their entirety, and the benefit of priority is claimed thereto.

The subject matter of the patent application is a tactile sensor with at least one sensor cell, a sensor cell comprising an electrically conductive workpiece made of flexible material and a connection to a first and a second electrode, and the flexible material changing its electrical volume resistance under mechanical load.

If robots and humans are intended to share a common working space, i.e. interact, then making the robot safe is of crucial importance. The robot must be able reliably to recognise its contacts and collisions with humans and objects. Tactile sensors are hereby used in order reliably to detect a contact between a robot and a human or an object. Furthermore, any object can however be provided with a tactile sensor. Thus tactile sensors are also used in other fields of application, e.g. in the input control of machines or in sensor mats.

Various approaches to the solution for contacting or collision recognition exist in the state of the art, in which the electrical volume resistance through the surface changes upon contacting a surface and hence an evaluatable signal is generated. Thus e.g. the publication DE 25 14 170 A1 displays a tactile sensor which is constructed from foamed material, contacted on both sides, or an antistatic floor covering. The contacting of the tactile sensor is effected by means of flexible metal nets or metal grids. In the case of the sensor, a mechanical load is detected in that the inner resistance or the volume resistance of the contacted ESD foam or floor covering changes. A locally resolved detection of the force input is not provided, the sensor exclusively detects a qualitative contact. However, no pressure distributions can be measured with such a sensor.

A tactile sensor can measure pressure distributions can be measured and which has a simple construction.

The object is can be achieved by the features of claim 1.

As a result of the fact that the tactile sensor has at least two sensor cells which are at a spacing from each other by means of an intermediate region, different forces acting on the tactile sensor can be separated from each other. Thus a differentiation can be made between a force which acts on a first sensor cell and a force which acts on a second sensor cell.

An individual sensor cell is formed in that an electrically conductive workpiece made of a flexible material is present, the flexible material changing its electrical volume resistance under mechanical loads, and being connected respectively to a first and a second electrode. In fact, the connection of the electrodes to the electrically conductive workpiece is thereby part of the sensor cell but not necessarily the electrode per se.

In the intermediate region, a medium with a greater specific resistance than the specific resistance of the electrically conductive workpieces of either the first or the second sensor cell is located at least partly. As a result of the fact that a medium with the greater specific resistance is present in the intermediate region, two adjacent sensor cells become decoupled from each other.

In order to ensure a particularly simple construction of the tactile sensor, two adjacent sensor cells are connected to a common first or second electrode. It is possible to configure an electrode in common since the measured sensory change—the change in volume resistance in the electrically conductive workpiece made of flexible material—is possible only between the electrodes to which a sensor cell is connected. The non-common electrodes of the two adjacent sensor cells should in addition be designed at a spacing from each other, i.e. if possible not protruding into the intermediate region.

According to the previously mentioned decoupling by the medium with a greater specific resistance in the intermediate region, essentially two different cases are conceivable. On the one hand, two adjacent sensor cells can have two electrically conductive workpieces which are designed completely separately from each other. The medium in the intermediate region could be formed here by air or distilled water, which both have a high specific resistance. Thus, it is highly improbable that a signal applied in a first sensor cell can be measured at the two electrodes of a second sensor cell. On the other hand, the electrically conductive workpieces of a first and of a second adjacent sensor cell can be in contact with each other as long as a medium with a higher specific resistance is present in the intermediate region at least partly. The connection between the first and the second sensor cell (or the parts of the electrically conductive workpiece which is contacted by respectively two electrodes directly and changes its volume resistance) is configured as a high-resistance bridge.

A particularly advantageous development is that the first and the second electrode of one sensor cell are fitted on two oppositely situated surfaces of the sensor cell. Since the volume resistance is measured through the electrically conductive workpiece made of flexible material, it is advantageous if the charge carriers can flow essentially vertically through the workpiece and thus impinge vertically on the electrodes of the sensor cell. As a result, the volume resistance in the unloaded state can be calculated particularly easily through the effective cross-sectional area and length (or thickness) of the sensor cell.

It is a further advantageous development if the first electrodes of the sensor cells are situated essentially in a first plane and the second electrodes of the sensor cells are situated essentially in a second plane and the first and the second plane are at a spacing from each other, in particular by means of the electrically conductive workpieces made of flexible material. As a result of the fact that the first electrodes are applied on the surfaces of the sensor cells with the same orientation, and analogously the second electrodes, the tactile sensor can be constructed in a particularly simple manner. In one production method, firstly a side of the tactile sensor can be provided with first electrodes which are applied respectively along a large number of sensor cells, and thereafter, by turning the sensor, the oppositely situated surfaces can be provided with the second electrodes.

It is a particularly advantageous development if the first and/or second electrode comprise a conductive material. Since material can be processed in many forms, this represents an advantageous development in particular in the case of subsequent fitting of a tactile sensor on an object or a robot since the tactile sensor can be bent by the particularly flexible electrodes into virtually any shape.

Furthermore, it is advantageous if the first and/or second electrode is glued and/or pressed onto the sensor cell by means of an external pressure. As a result of the gluing or pressing, a defined contact surface between electrode and the electrically flexible workpiece of the sensor cell is produced. As a result, a variable transition resistance between electrode and electrically conductive workpiece made of flexible material is prevented so that essentially only the volume resistance is measured by the electrically conductive material of an individual sensor cell. This enables better, in particular quantitative, measurement of the evaluatable signal in one of the sensor cells.

Alternatively or in combination with the preceding feature, the first and/or the second electrode can be connected to the sensor cell also by means of a conductive yarn. Furthermore, the first and/or second electrode can also be sewed together with a covering, the covering being in direct communication with the sensor cell. The feature of the covering is explained in more detail at a subsequent point.

It is a particularly advantageous development if two adjacent sensor cells and the intermediate region situated therebetween are formed from a common, electrically conductive workpiece made of flexible material. As a result of the configuration of two adjacent sensor cells with an electrically conductive workpiece which, according to claim 1, has a medium with a higher specific resistance than that of the electrically conductive workpiece in the intermediate region at least partly, a high-resistance intermediate region is produced between the first and the second adjacent sensor cell. The intermediate region can have a high-resistance configuration in that specific parts in the intermediate region are removed by milling, punching or cutting from the latter and the remaining material forms the connection in the intermediate region. The connection in the intermediate region thereby has, in the plane of the workpiece viewed from a first of the two adjacent cells in the direction of the second of the two adjacent cells, a smaller cross-sectional area than the cross-sectional area of the first and/or second sensor cell, the plane of the workpiece corresponding essentially to the xy plane of the embodiments and the viewing direction accordingly being the x or y direction. Correspondingly, the cross-sectional areas are then situated in the yz or xz plane. As a result, the above-mentioned high-resistance bridge is produced.

This is particularly advantageous when the intermediate region comprises as a connection a web with a smaller cross-sectional area than the respective cross-sectional area of the two adjacent sensor cells, the volume resistance through the web being greater than the volume resistance of the electrically conductive workpiece between the first and second electrode respectively of one of the two adjacent sensor cells. In this way, the volume resistance of the common, electrically conductive workpiece in the intermediate region is greater than the resistance to be overcome between the first and second electrode of one of the sensor cells. As a result, the probability arises that a signal which was generated in the electrically conductive workpiece of the region of the first sensor cell can be measured between the two electrodes of the second sensor cell. This development is particularly advantageous when all the sensor cells have a common, electrical workpiece made of flexible material. This can be produced particularly easily by stamping, milling or cutting. A large workpiece made of the flexible material can thereby be subdivided within one operating step by stamping into a large number of individual sensor cells, the individual sensor cells respectively being at a spacing from each other by means of high-resistance webs or other high-resistance connections.

By adaptation of the cross-sectional area of the connection in the intermediate region, the local resolution of the sensor inter alia can also be influenced since a lower cross-sectional area (in comparison with the cross-sectional area of the sensor) requires a smaller length, perpendicular to the cross-sectional area, of the connection of the intermediate region in order to achieve satisfactory decoupling of the two adjacent sensor cells.

Reference may be made at this point to the fact that the sensor cells and/or the connections can all have a uniform size (as a result, a uniform local resolution of the tactile sensor is achieved), however the sensor cells and/or the connections can also have different sizes, as a result of which the local resolution of the tactile sensor varies. As a result, the tactile sensor can have regions of increased and reduced local resolution, which is advantageous in different applications in for example robot systems. Thus a tactile sensor can have a higher local resolution in regions in which better knowledge of the applied pressures is required.

It is a particularly advantageous development of the tactile sensor according to the invention, that the latter has a sensor cell grid with at least four sensor cells. As a result, a maximum number of sensor cells can be contacted at the same time by a minimum number of electrodes. Thus for example in the presence of $n^2$ sensor cells which are disposed respectively in n rows and n columns along the grid vectors, can be tapped completely and independently of each other with 2n electrodes, the first electrodes extending in the direction of the first grid vector and the second electrodes in the direction of the second grid vector. The grid vectors can thereby be situated at various angles relative to each other, in particular different portions of the sensor cell grid can have different grid vectors. Thus the tactile sensor can be adapted to different geometries.

It is a further advantageous development if the flexible material is an electrically conductive foamed material. Electrically conductive foamed material reacts under a mechanical load with a reduction in the volume resistance thereof. In addition, foamed material can be processed particularly easily so that punching, cutting or milling with simple production methods is possible. By increasing the foamed material thickness, the sensor can in addition be equipped with shock-absorbing properties. At the same time, the force resolution of the sensor cells can consequently be increased. By using softer or harder foamed materials, the sensitivity or the force measuring range of the sensor cells can be varied. In addition, the hardness has an effect on the robustness of the sensor. The individual sensor cells made of foamed material can be varied particularly easily in their size, which has an advantageous effect on the possibilities of the intended force resolution of the individual cells.

It is a further advantageous development that the sensor cells have a covering. By means of a covering, the tactile sensor can be protected relative to external environmental influences. This has advantageous effects on the lifespan and the fields of use of the tactile sensor. Thus it is conceivable for example to produce, with the help of a foil, a tactile sensor which has a water-tight configuration and functions without friction under wet conditions. However a breathable or air-permeable shell material can also be chosen so that the sensor can have an air-permeable configuration because of the air present in the intermediate regions. In particular in the intermediate regions, in addition seams can thereby be introduced in the covering which ensures an additional spacing of the different sensor cells from each other. Furthermore, the electrodes can be pressed by the covering onto the at least one electrically conductive workpiece of the tactile sensor.

It is a further advantageous embodiment that the electrodes connected to the sensor cells are connected to an evaluation unit. By means of the evaluation unit, the resistances of the individual sensor cells can be measured in a simple manner with the help of a suitable electronic circuit and changes in resistance can be detected. A resistance chart can be produced from the measuring values, from which both location and strength of the force effect on the sensor can be read out. This is particularly advantageous when the resistance measurements are effected with the help of a multiplexer circuit. With the help thereof, respectively one cell is selected and connected to an external resistance in a voltage divider.

Advantageously, a voltage which is proportional to the resistance is thus detected for each cell and evaluated with a suitable data evaluation method. Furthermore, the evaluation unit can have an A/D converter. As a result of this automation of the evaluation, the sensor can be used economically in particular in the field of robotics or automation technology.

A strip conductor between the evaluation unit and the electrodes connected to the sensor cells can be formed, on the one hand, by means of wire or by means of a conductive yarn. When using a conductive yarn, respectively at least one electrode, preferably at least one electrode made of a conductive material web, is connected to a piece of the yarn and the yarn is guided to the evaluation unit. The guidance is effected in such a manner that the yarn pieces which are respectively assigned to various electrodes do not touch. The guidance can be achieved for example by sewing the yarn on a carrier, advantageously on a textile carrier. As a result, the flexibility of the tactile sensor is increased since, in the region of the sensor cells, no wires are necessary for connection of the tactile sensor to the evaluation unit. For connection of the yarn to the evaluation unit, the ends of the individual yarn pieces which are assigned to various electrodes, can be provided with respectively one plug-in bush. The carrier can be for example a protruding part of a cover or a textile piece on which the sensor cells are also disposed.

The different embodiments of the above-described tactile sensor can be combined with each other.

The different embodiments can be used in a large number of applications.

One application is a security system which is pressure-sensitive. The tactile sensor can be used in the security system as collision monitoring sensor or as contact sensor, or, lying on a base as a circuit mat, can measure and evaluate the location and the movement of an object situated on the circuit mat, and possibly can trigger an alarm.

In the form of a contact sensor, the tactile sensor can be assigned for example to a robot system and serve as contact-sensitive, artificial skin in specific elements of the robot system, such as e.g. a gripping element. As a result, the robot system receives feedback about its interaction with the surroundings, hence can perceive other objects by pressure sensitivity.

A further application is the use of the tactile sensor as a tactile input- and/or control device. The tactile sensor can be used as an input device, for example a keyboard, for a mobile data processing unit, such as mobile telephone, music players or computer, the number of keys being able to extend from a simple numeric keyboard with less then ten keys up to a large PC keyboard with more than a hundred keys. However, the tactile sensor can also be used as a general pressure-sensitive input device with a mobile data processing unit. Furthermore, a knob with a tactile sensor can be provided in order to operate a robot system, the pressures applied at different positions of the knob being converted into different movements of at least parts of the robot system. The pressures can thereby be applied with at least one hand and/or one foot and/or a further robot system. Furthermore it is possible to produce the input device in the form of a glove, so that the pressures applied due to the movements of the hand in the glove are transmitted directly to the robot system.

Further advantages are disclosed in the coordinated claims.

The tactile sensor according to the invention is intended to be explained in more detail with reference to some embodiments. There are shown.

Figure 1A:
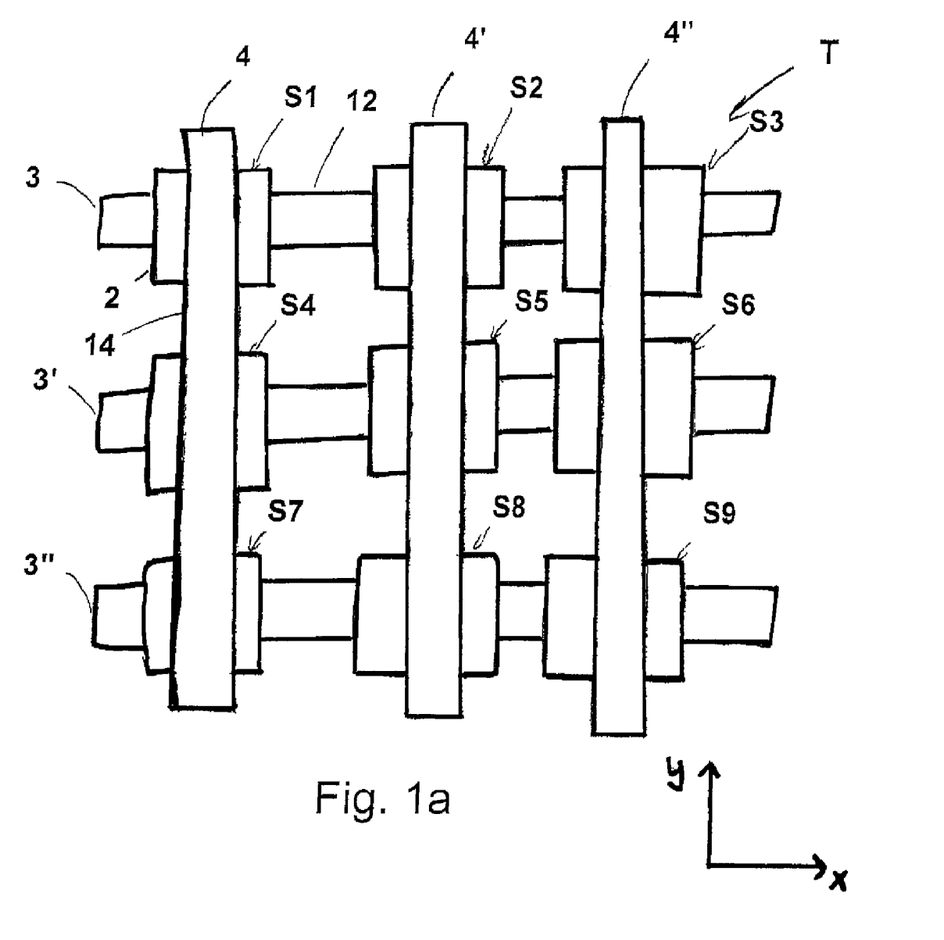
FIGS. 1a to 1c first variant of the tactile sensor according to an embodiment of the invention, FIGS. 2a to 2c second variant of the tactile sensor according to an embodiment of the invention, FIGS. 3a to 3c mode of operation of the second variant of the tactile sensor, FIG. 4 tactile sensor with evaluation unit, FIGS. 5a and 5b tactile sensor according to an embodiment of the invention with covering.

In FIG. 1a, a tactile sensor T with nine sensor cells S1 to S9 at a spacing from each other is shown. An individual sensor cell thereby comprises an electrically conductive workpiece made of a flexible material, said material here being an electrically conductive foamed material 2. Below the sensor cells S1 to S3, there extends an electrically conductive material web 3 which connects the three sensor cells to each other. Analogously thereto, the electrically conductive material web 3' connects the sensor cells S4 to S6 and the electrically conductive material web 3" connects the sensor cells S7 to S9. On the sensor cells S1, S4, S7, an electrical material web 4 extends from top to bottom in the picture direction. Analogously thereto, the electrically conductive material web 4' extends over the sensor cells S2, S5, S8 and the electrically conductive material web 4" over the sensor cells S3, S6 and S9.

The electrically conductive material webs 3, 3', 3" and 4, 4', 4" are glued to the foamed material 2 of the respective sensor cells S1 to S9. There is produced by gluing a solid contact surface which does not vary in the size thereof even with a pressure load of an individual sensor cell and therefore shows no variable transition resistance.

The electrically conductive material webs form the electrodes of the sensor cells S1 to S9. It can be readily detected that an individual sensor cell S1 to S9 has respectively only one electrode in common with its neighbour. Thus for example the sensor cell S1 has in common with the adjacent sensor cell S2 the electrically conductive material web 3, in common with the sensor cell S4 it has the electrically conductive material web 4. The sensor cell S5 is not a sensor cell adjacent to the sensor cell S1 since the latter have no common electrodes. The individual sensor cells are connected exclusively to each other by their direct neighbour via an electrode.

The electrically conductive foamed material 2 of the sensor cell S1 and the electrically conductive foamed material of the sensor cell S2 are separated from each other by an intermediate region 12. Air is located in the intermediate region and has a greater specific resistance than the electrically conductive foamed material 2. As a result of complete separation of the electrically conductive foamed materials 2 of the individual sensor cells, a force input applied in a sensor cell cannot lead to a signal between the electrodes of an adjacent sensor cell. It is thereby useful, for the width of the intermediate region 12 between the sensor cell S1 and sensor cell S2, merely that the individual foamed material pieces of the sensor cells do not touch even in the fully loaded state in order thus to avoid a possible contact surface effect between the sensor cells S2 and S1. As a result of the fact that the intermediate region between the individual sensor cells should not be large, there exists between two sensor cells only a small range in which no force input can be recorded. Due to the small spacing the result is therefore good local resolution of the tactile sensor T, clear differentiation between signals within the individual sensor cells being possible and only a few ranges existing in which no signal can be recorded. Hence a sensory decoupling of the individual sensor cells takes place.

If a mechanical load is applied for example in the sensor cell S1, then a voltage or current change can be measured by an evaluation unit to be discussed later if the circuit across the electrodes 3 and 4 is closed. Assuming that no force input results in the sensor cell S2, no change in voltage or current will be displayed even across a closed circuit with the electrodes 3 and 4' in spite of a force input in the sensor cell S1.

In FIG. 1, the material strips 3, 3', 3" and 4, 4', 4" do not cover the entire upper or lower side of the electrically conductive foamed material 2. The size of the individual sensor cell is established by the size of the electrically conductive foamed material 2 of the individual sensor cells S1 to S9. As will be shown again subsequently, the electrodes are applied particularly advantageously if these cover the entire upper or lower side of the electrically conductive foamed material of the sensor cells S1 to S9. For example copper-nylon is suitable as material for the electrically conductive material. Nevertheless, further materials for the electrodes are also conceivable. The electrodes can also be pressed onto, instead of glued onto, the electrically conductive foamed material. As a result of the fact that the electrodes are pressed or glued onto the foamed materials, a continuous sensor mat is produced, which has high flexibility in the intermediate regions because of the thin design of the electrically conductive material webs.

Figure 1B:
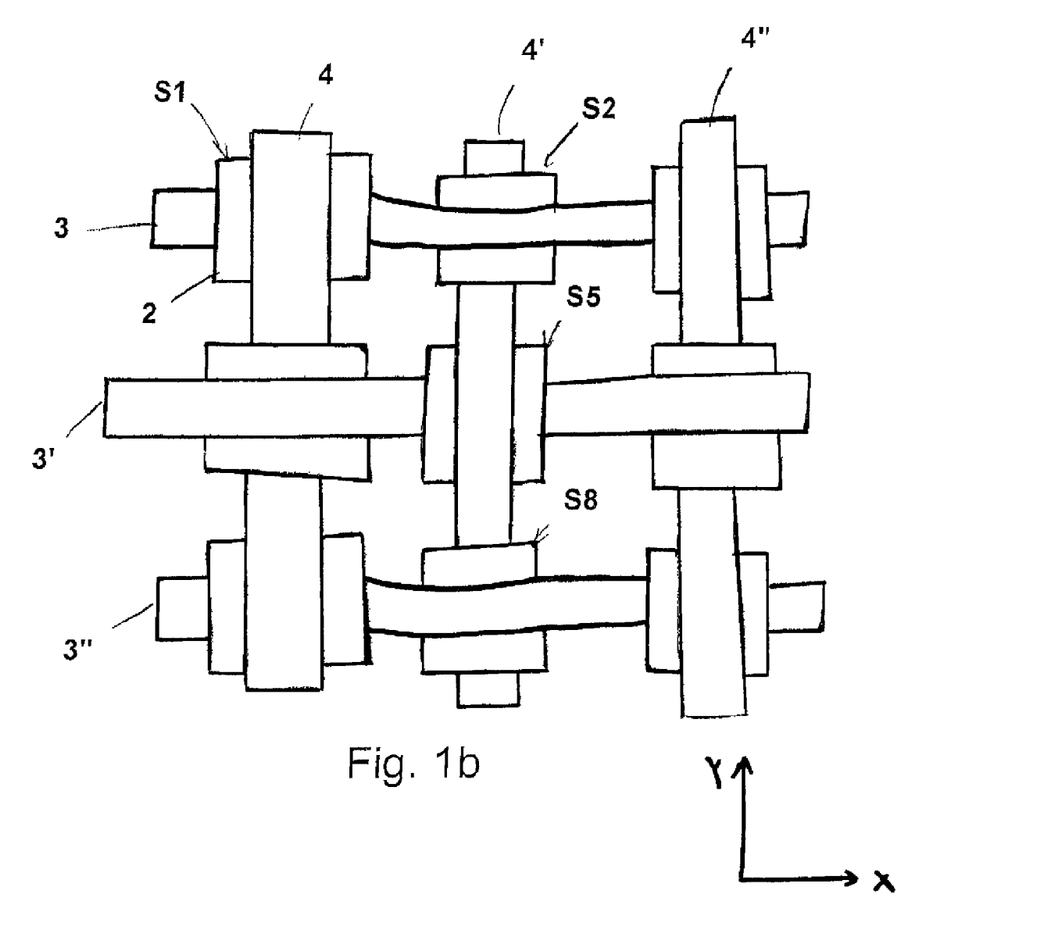

In FIG. 1b, an alternative application of the electrodes 3, 3", 3" and 4, 4', 4" is shown. The electrically conductive foamed materials 2 of the sensor cells S1 to S9 are thereby "interwoven" with the material webs 3, 3", 3" and 4, 4", 4". This means that the material web 4 contacts the upper side of the sensor cell S1, the lower side of the sensor cell S4 and again the upper side of the sensor cell S7 and is connected to the latter. The electrically conductive material web 4' forms a pattern complementary thereto in that it connects the lower side of the sensor cell S2, the upper side of the sensor cell S5 and in turn the lower side of the sensor cell S8. The material webs 3 and 3' are now applied such that the respectively not yet contacted upper or lower side of the individual sensor cells, situated opposite the electrodes 4 or 4', is contacted. Although a construction of the tactile sensor of this type appears substantially more complicated than the form shown in FIG. 1a, some advantages can indeed be achieved. Thus in particular in the case of partially electrically conductive material webs 3, 3', 3" and 4, 4', 4" which extend over the entire upper or lower side of a sensor cell S1, two adjacent sensor cells are prevented by the material webs which are non-conductive in these regions from forming a contact surface with each other and correspondingly a transition resistance. In the case of material webs which are configured to be conductive over their entire extent, these should have a rigid configuration in order not to enable direct conductive contact between two adjacent sensor cells.

Figure 1C:
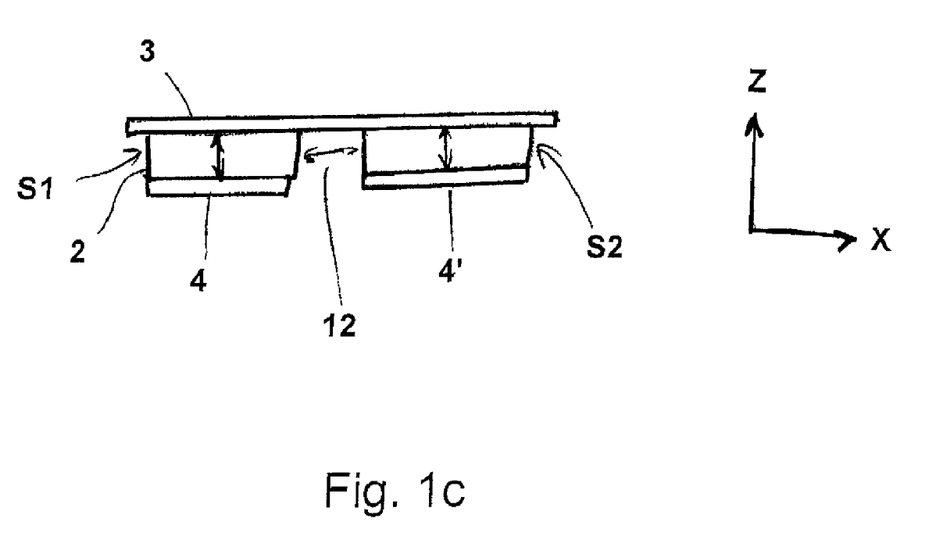

In FIG. 1c, the decoupling between two adjacent sensor cells is intended to be dealt with once again. There can be seen a section through the tactile sensor T shown in FIG. 1. In the X-Z plane, the electrode 3, the sensor cells S1 and S2 and also the electrodes 4 and 4' which are connected thereto are thereby shown. If a voltage is applied to the electrodes 3 and 4, a current flows in the direction of the double arrow within the foamed material 2 through the sensor cell S1. The electrically conductive foamed material 2 can be illustrated thereby in an equivalent circuit diagram as a resistance. The resistance is calculated through the thickness of the foamed material 2 which is given in Z direction by the cross-sectional area of the sensor cell S1, situated transversely relative to the double arrow, and the specific resistance of the foamed material 2. The resistance is thereby all the lower, the thinner the sensor or the greater the cross-sectional area of the electrically conductive foamed material 2 viewed in X-Y direction. In the intermediate region, the resistance is determined by the cross-sectional area in the Y-Z direction, by the spacing between the right delimitation of the sensor cell S1 and the left delimitation of the sensor cell S2 in X direction and the specific resistance of the medium in the intermediate region.

In FIGS. 1a, b, c, air is present in the intermediate region, which has a higher specific resistance than the electrically conductive foamed material. The resistance in the intermediate region, in FIGS. 1a to c, is thereby essentially approx. ∞.

Figure 2A:
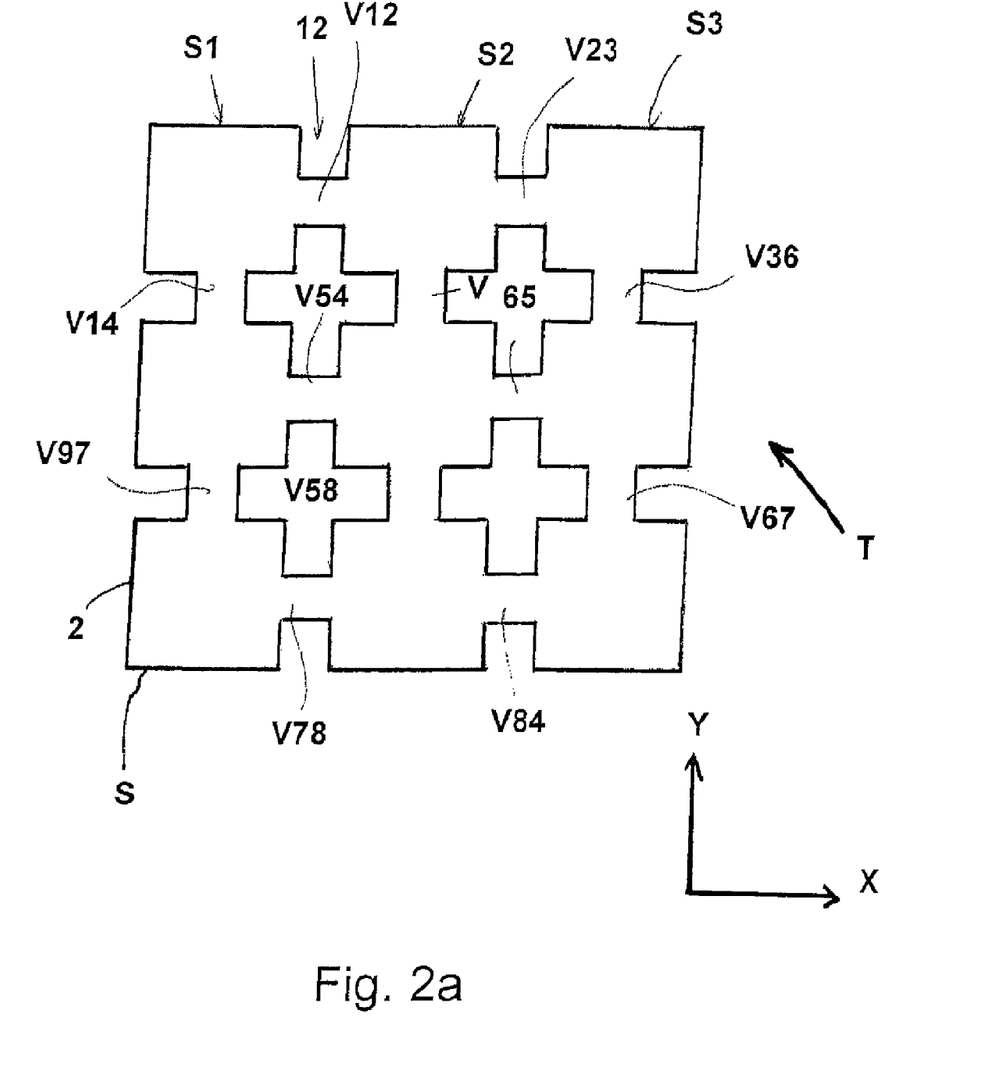
Figure 2B:
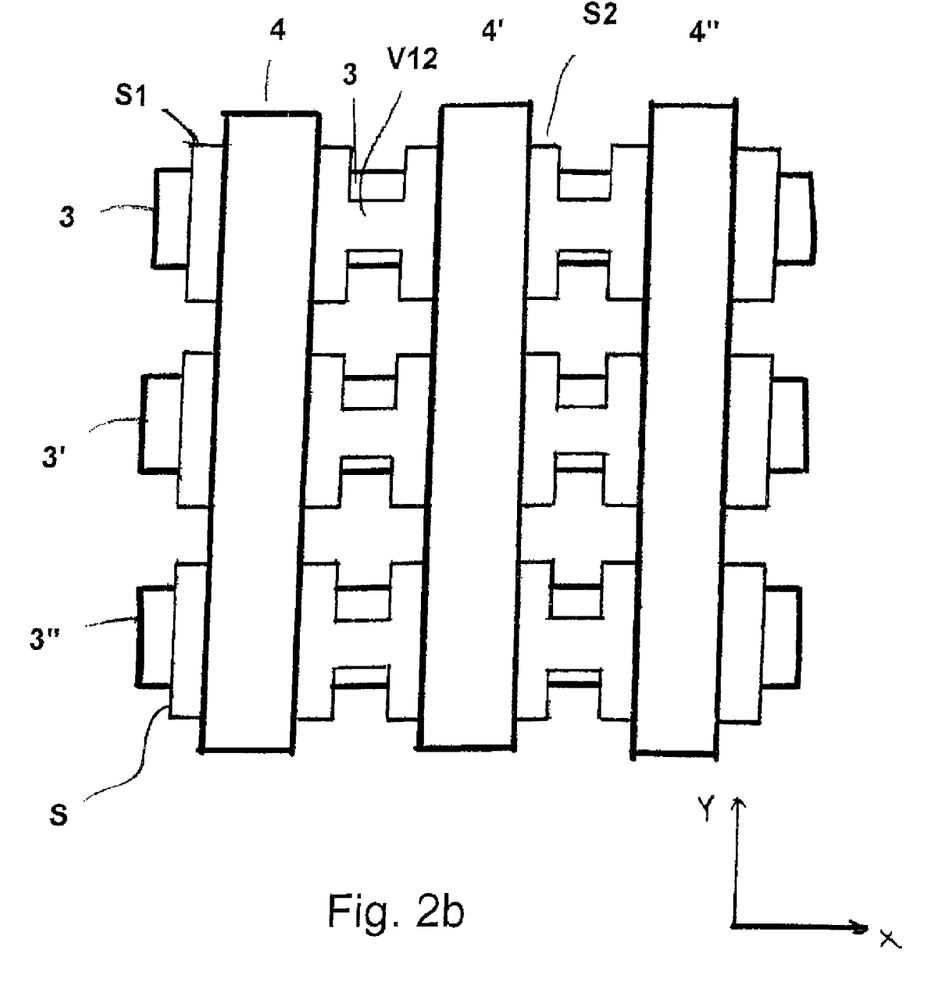
Figure 2C:
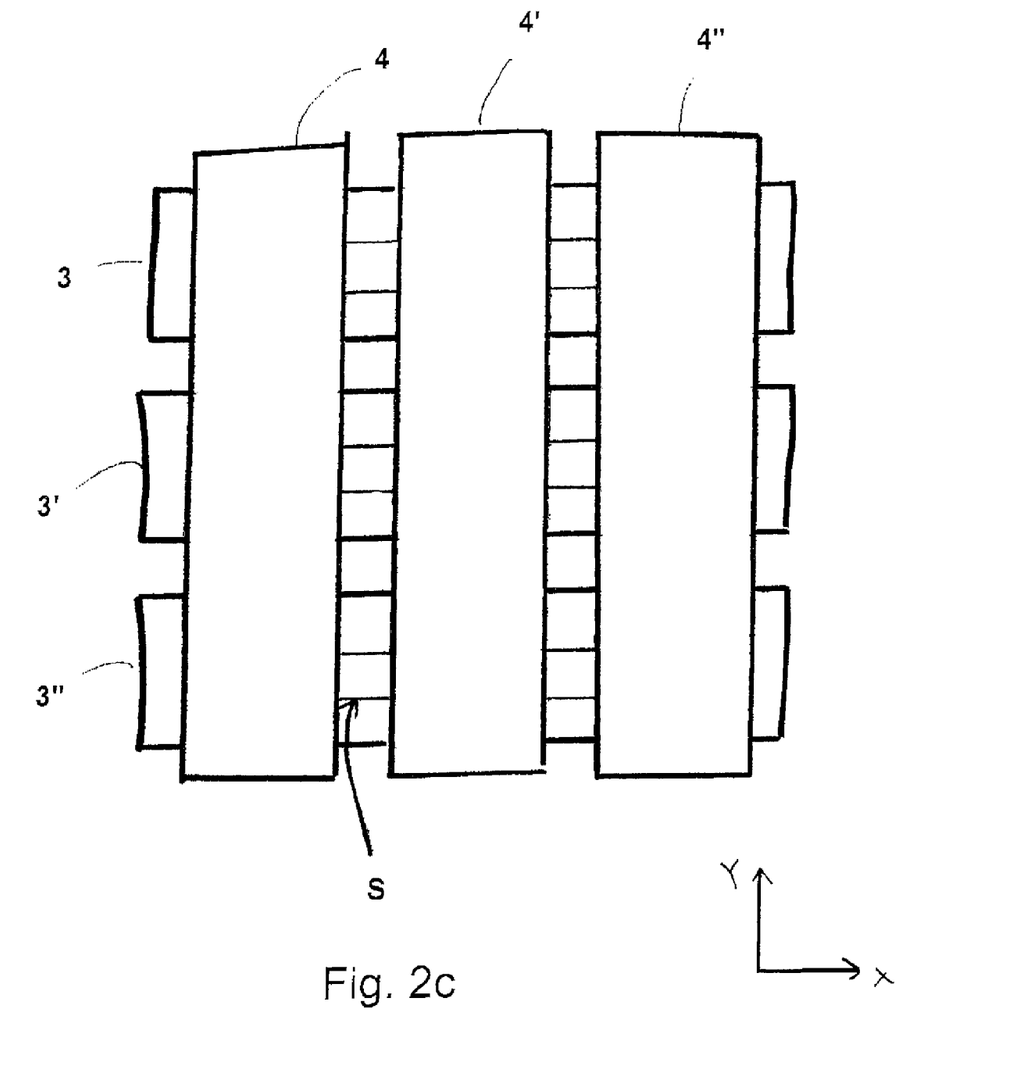

In FIGS. 2a, 2b and 2c, a second alternative embodiment of the tactile sensor T is shown. In FIG. 2a, essentially a single sensor mat S is shown, which comprises nine sensor cells S1 to S9, the sensor cells with a respectively adjacent sensor cell being provided in the intermediate region with a web V (V12, V13, V14, V25, V36, V45, V56, V47, V58, V69, V78 and V89). The workpiece S is again manufactured from a conductive electrical foamed material 2. The particular feature of the webs V resides in the fact that these do not fill the entire intermediate region. This is intended to be explained with the example of the web V12. The right interface of the sensor cell S1 extending in Y and Z direction or the left interface of the sensor cell S2 extending in Y and Z direction is connected in a certain partial region by the web V12, the latter having a smaller cross-sectional area, viewed transversely relative to the X direction, than the right or left interface of the sensor cells S1 or S2. As a result of the smaller cross-sectional area of the web V12, the volume resistance through the web V12 in X direction is greater than in a plane of the sensor cell S1 or S2 extending parallel thereto. In addition, the volume resistance in the sensor cells S1 and S2 in Z direction (because of the corresponding thickness of the foamed material 2 in Z direction) is likewise less than the volume resistance in the web V12 in the X direction. As a result, the sensor cells can be configured very closely to each other, i.e. with an intermediate region 12 which is only very narrow in X direction (or in the other intermediate regions in X and in Y direction) if merely the cross-sectional area of the webs V extending transversely at the spacing of the respectively adjacent sensor cells turns out to be small enough. The precise mode of operation is dealt with in FIGS. 3a to 3c. A great advantage of the tactile sensor T shown in FIG. 2a resides in the fact that a large continuous foamed material mat can be processed by stamping to form a sensor mat which has good local resolution and decoupling of the sensor cells from each other.

In FIG. 2b, the sensor mat S is applied with the applied electrically conductive material webs 3, 3', 3" and 4, 4', 4", as shown already in FIGS. 1a and 1c.

In the intermediate region 12, it can be seen that the web V12 is covered completely by the material web 3 but is not contacted by the material webs 4 or 4'. In order to measure a load applied in the sensor cell S1 in the sensor cell S2, a path, as electrical strip conductor, from the electrode 3 through the sensor cell S1 and the high-resistance web V12 and subsequently in the sensor cell S2 into the electrode 4' must be found, which is however virtually impossible because of the high-resistance of the web due to the small cross-sectional area.

In FIG. 2c, the sensor mat S of FIG. 2a is represented once again but this time with electrically conductive material webs 3, 3', 3" and 4, 4', 4" which completely cover respectively the upper and lower side of the individual sensor cells S1 to S9. The surface covered by the material webs of the individual sensor cells jointly decides how strong the resistance reduction or increase is on the basis of an applied force or how sensitively an individual sensor of the sensor mat can measure.

Figure 3A:
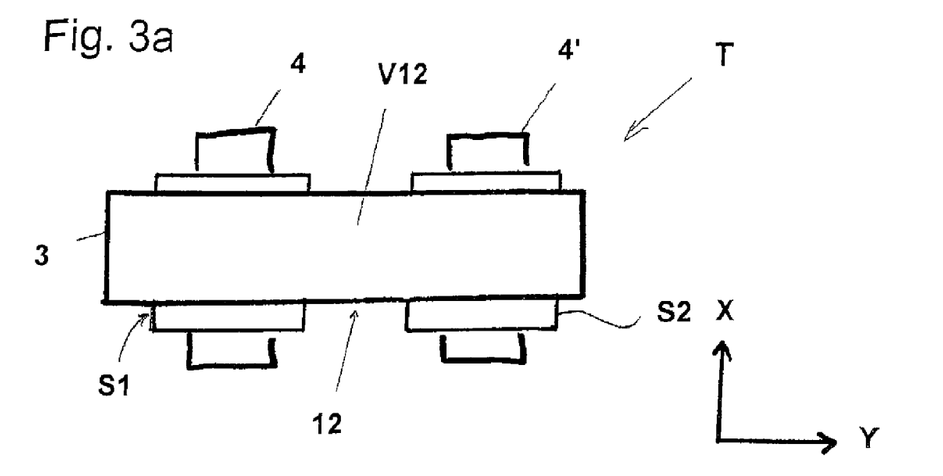
Figure 3B:
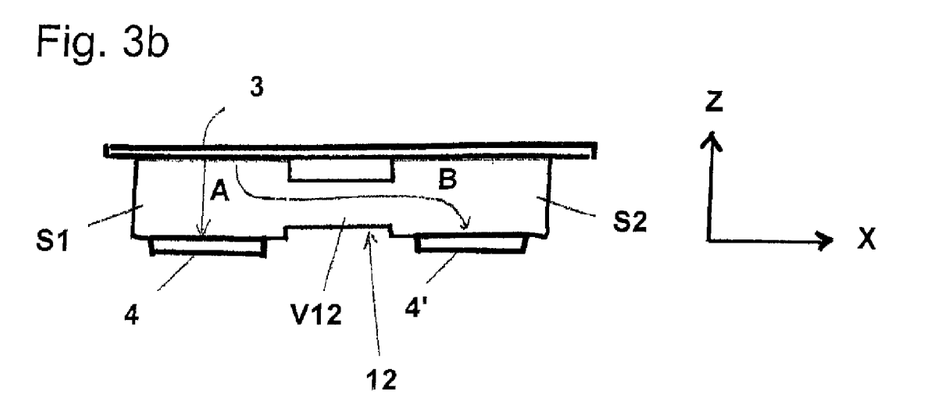

In FIGS. 3a and 3b, it is intended to be explained precisely how the high-resistance web prevents a signal applied in one sensor cell being able to be measured likewise in an adjacent sensor cell. In FIG. 3a, the material webs 3, 4, 4' and also the sensor cells S1 and S2 with the intermediate region 12 and the web V12 situated therein are shown in the X-Y plane. As already shown in FIG. 2a, the web V12 has a longer dimension in the Y direction than the left or right interface of the sensor cell S1 or S2. In FIG. 3b, a section through the arrangement of FIG. 3a is shown, with which the dimensions in the X direction are intended to be demonstrated. For the sake of simplicity, the dimensions of the high-resistance web V12 in the Z direction are likewise not so large as the dimensions of the sensor cells S1 or S2 in the same direction. However it is not absolutely necessary to strive for a reduction in cross-sectional area in both dimensions, i.e. in Y and Z direction. In FIG. 3b, two schematic running paths for electrons are shown in addition, the running path A connecting the electrodes 3 and 4 directly through the sensor cell S1, and the running path B passing through the electrodes 3 and 4' through the sensor cell S1, the web V12 and sensor cell S2. These two scenarios are intended to apply as analogies for a force applied in the sensor cell S1 at the same time producing a signal between the electrodes 3 and 4' or 4.

Figure 3C:
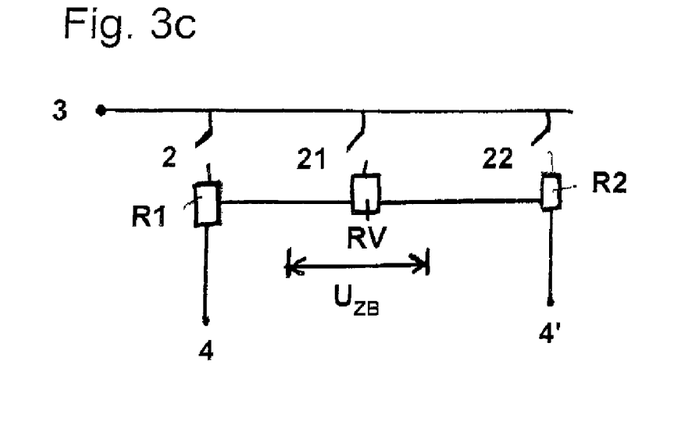

The running path A in FIG. 3c corresponds to the situation where the circuit 20 is closed and the changed resistance of the sensor cell S1 R1 between the electrodes 3 and 4 can be tapped. The running path B corresponds to the situation where the electrons must run not only through the resistance R1 but likewise through the resistance RV of the high-resistance web V12 and, at least in parts, through the resistance R2 of the sensor cell S2. Since these are connected in series and the volume resistance of the high-resistance web can be regarded as very large, a high voltage Uzb is reduced at this so that only a fairly small additional measuring voltage can be measured at the electrode 4'. The smaller the chosen cross-sectional area of the high-resistance web V12, the greater is the resistance RV and influence on the voltage applied at the electrodes 3 and 4' becomes all the lower.

In the case where a load is applied not only in the sensor cell S1 but also in the sensor cell S2 then, because of the above-mentioned, it can be virtually precluded that the load measured respectively in the sensor cells S1 and S2 originates from the adjacent cell or influences the measurement since these are decoupled from each other by the high-resistance RV.

Of course it is also possible to combine the tactile sensors of FIGS. 1 and 2 with each other in that some sensor cells are configured continuously and others are configured completely at a spacing from the other sensor cells. This can take place for example if it is to be expected that specific regions of the tactile sensor are subjected to greater wear and tear than other regions.

Figure 4:
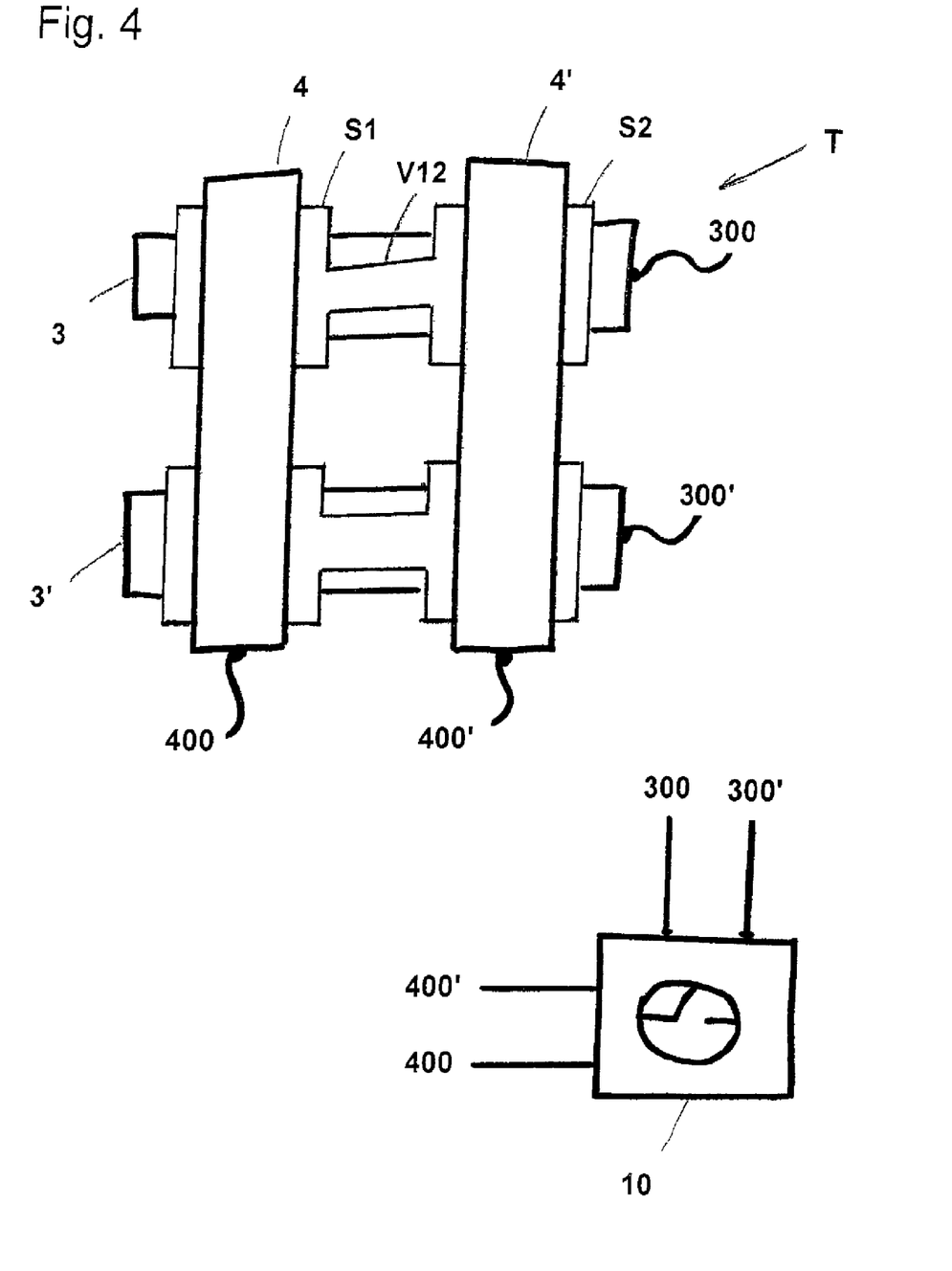

In FIG. 4, an evaluation unit is also intended to be dealt with. The tactile sensor T illustrated in FIG. 4 shows four sensor cells which are connected to respectively two electrodes 3, 3' and 4, 4'. Each electrode is thereby connected to an evaluation unit 10 simply via the connections 300, 300' or 400, 400'. In this evaluation unit, the different combinations of electrodes are switched through either by a multiplexer circuit or by hand and are provided with a voltage measuring device in order to establish in which sensor cell a load is present.

Figure 5A:
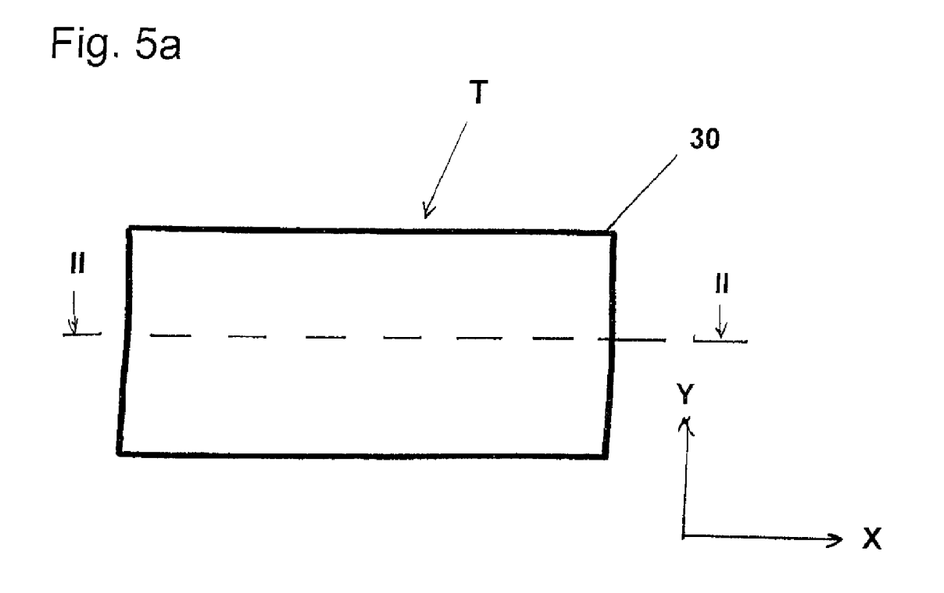

In FIG. 5a, a tactile sensor T with a covering 30 is shown. The covering can hereby be manufactured both purely as a material covering or made of plastic or made from a foil, as a function of how the foamed material sensor is intended to be used. There are possible as alternative materials for the foamed material silicone, rubber or other conductive flexible materials.

Figure 5B:
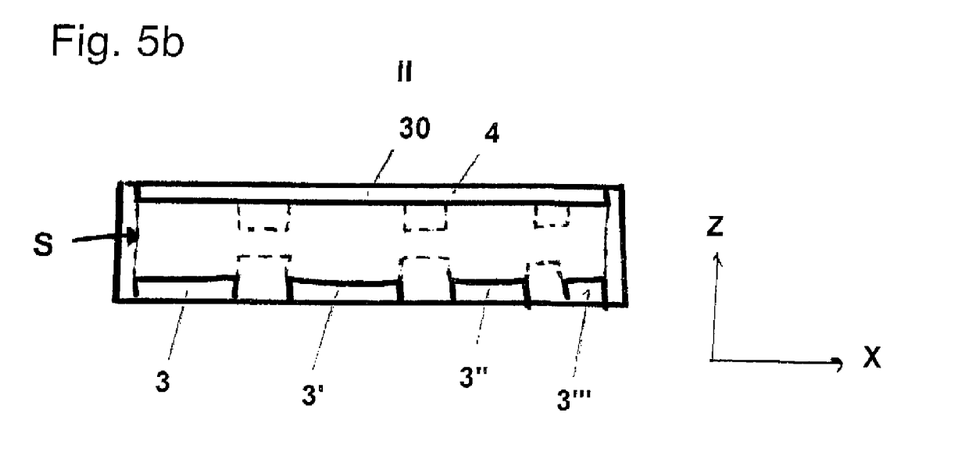

In FIG. 5b, a section through the tactile sensor T of FIG. 5a is shown. This is similar in construction to the tactile sensor of FIGS. 2a to 2c. The covering 30 can thereby be sewn or welded in addition along the high-resistance webs in order to form additional stability and flexibility in the region of the high-resistance webs.

The form of the sensor cells is not restricted, as shown in the embodiments, to squares, these can also comprise without difficulty irregular quadrilaterals, triangles (these being able then to have three webs branching from one sensor cell), or circles or virtually any geometric shapes.

The size of the sensor cells determines the local resolution of the sensor mat. For example edge lengths between 0.5 and 10 cm are conceivable, which correspondingly results in cell sizes between 0.25 and 100 $cm^2$. With increasing size of the sensor cells, the force resolution within the individual cells reduces. The intermediate regions can be between 0.1 cm and 1 cm, preferably up to 0.5 cm wide.

The tactile sensors shown here are particularly well suited to security-critical applications. When an individual sensor cell fails, the resistance of the individual sensor cell would move towards ∞ without other sensor cells having to be impaired therefrom. In addition, the ageing of the sensor can be monitored as a result since, with increasing operating time, the elasticity of the foamed material reduces and the resistance hence drops in the unloaded state.

The claimed invention is:

1. A tactile sensor with at least two sensor cells, each cell comprising an electrically conductive workpiece made of flexible material and a connection to a first and second electrode, and the flexible material changing its electrical volume resistance under mechanical load, wherein the at least two sensor cells are adjacent and at a spacing from each other by means of an intermediate region, and the at least two sensor cells have either common first electrodes or common second electrodes and, in the intermediate region between the at least two sensor cells, the electrically conductive workpiece of a first of the at least two sensor cells and the electrically conductive workpiece of a second of the at least two sensor cells are separated from each other at least partly by a medium with a greater specific resistance than the electrically conductive workpieces of the first or second sensor cell, wherein the electrically conductive workpieces are connected to each other by a web.

2. The tactile sensor according to claim 1, wherein the two electrodes of each sensor cell are located on two oppositely situated surfaces of the electrically conductive workpiece of each sensor cell, respectively.

3. The tactile sensor according to claim 2, wherein the first electrodes of the sensor cells are situated essentially in a first plane and the second electrodes of the sensor cell are situated essentially in a second plane and the first and the second plane are at a spacing from each other.

4. The tactile sensor according to claim 1, wherein the first and second electrode have a conductive material.

5. The tactile sensor according to claim 1, wherein at least one of the two electrodes of the at least two sensor cells is brought in contact to its respective workpiece by one of gluing or pressing.

6. The tactile sensor according to claim 1, wherein the conductive workpieces of the two sensor cells and the intermediate region situated therebetween are formed from a common, electrically conductive workpiece made of flexible material.

7. The tactile sensor according to claim 6, wherein the intermediate region comprises the web connecting the workpieces of the two adjacent sensor cells, the volume resistance through the web being greater than the volume resistance of the electrically conductive workpiece between the first and second electrode respectively of either of the two sensor cells.

8. The tactile sensor according to claim 6, wherein all the sensor cells have a common electrical workpiece made of flexible material.

9. The tactile sensor according to claim 1, wherein a sensor cell grid has at least four sensor cells, the sensor cell grid being spanned by a first and a second grid vector, which cells are at an angle of 60° to 120° relative to each other, and the sensor cells being situated on the grid points, and has a first group of at least two first electrodes, the electrodes of the first group being connected to the sensor cells in the direction of the first grid vector, and a second group of at least two second electrodes, the electrodes of the second group being connected to the sensor cells in the direction of the second grid vector.

10. The tactile sensor according to claim 8, wherein the flexible material is an electrically conductive foamed material.

11. The tactile sensor according to claim 1, wherein a covering is present.

12. The tactile sensor according to claim 11, wherein the covering comprises at least one of a group including a material and a foil and a foamed material.

13. The tactile sensor according to claim 1, wherein the electrodes connected to the sensor cells are connected to an evaluation unit.

14. The tactile sensor according to claim 13, wherein the evaluation unit comprises a multiplexer circuit.

15. The tactile sensor according to claim 1, wherein a sensor cell grid has at least four sensor cells, the sensor cell grid being spanned by a first and a second grid vector, which cells are at an angle of 85° to 95° relative to each other, and the sensor cells being situated on the grid points, and has a first group of at least two first electrodes, the electrodes of the first group being connected to the sensor cells in the direction of the first grid vector, and a second group of at least two second electrodes, the electrodes of the second group being connected to the sensor cells in the direction of the second grid vector.

16. A tactile sensor comprising:
at least two adjacent sensor cells which are at a spacing from each other by means of an intermediate region, the sensor cell comprising an electrically conductive workpiece made of flexible material and a connection to a conductive first and second electrode affixed on two oppositely situated surfaces of the sensor cell, the flexible material changing its electrical volume resistance under mechanical load;
wherein the two adjacent sensor cells are connected to a common first or second electrode and, in the intermediate region between a first and a second adjacent sensor cell, the electrically conductive workpiece of the first and of the second sensor cell are separated from each other at least partly by a medium with a greater specific resistance than the specific resistance of the electrically conductive workpieces;
wherein the first electrodes of the sensor cells are situated essentially in a first plane and the second electrodes of the sensor cell are situated essentially in a second plane and the first and the second plane are at a spacing from each other;
wherein two adjacent sensor cells and the intermediate region situated therebetween are formed from a common, electrically conductive workpiece made of flexible material;
wherein the intermediate region comprises a web, the volume resistance through the web being greater than the volume resistance of the electrically conductive workpiece between the first and second electrode respectively of one of the sensor cells; and
wherein the tactile sensor comprises a sensor cell grid that has at least four sensor cells, the sensor cell grid being spanned by a first and a second grid vector, which cells are at an angle of 60° to 120° relative to each other, and the sensor cells being situated on the grid points, and has a first group of at least two first electrodes, the electrodes of the first group being connected to the sensor cells in the direction of the first grid vector, and a second group of at least two second electrodes, the electrodes of the second group being connected to the sensor cells in the direction of the second grid vector.

17. A tactile sensor with at least two sensor cells, each cell comprising an electrically conductive workpiece made of flexible material and a connection to a first and second electrode, and the flexible material changing its electrical volume resistance under mechanical load, wherein the at least two sensor cells are adjacent and at a spacing from each other by means of an intermediate region, and the at least two sensor cells have either common first electrodes or common second electrodes and, in the intermediate region between the at least two sensor cells, the electrically conductive workpiece of a first of the at least two sensor cells and the electrically conductive workpiece of a second of the at least two sensor cells are separated from each other at least partly by a medium with a greater specific resistance than the electrically conductive workpieces of the first or second sensor cell, the tactile sensor including a covering which presses the electrodes of each sensor cell upon its respective electrically conductive workpiece.

18. A tactile sensor with at least two sensor cells, each cell comprising an electrically conductive workpiece made of flexible material and a connection to a first and second electrode, and the flexible material changing its electrical volume resistance under mechanical load, wherein the at least two sensor cells are adjacent and at a spacing from each other by means of an intermediate region, and the at least two sensor cells have either common first electrodes or common second electrodes and, in the intermediate region between the at least two sensor cells, the electrically conductive workpiece of a first of the at least two sensor cells and the electrically conductive workpiece of a second of the at least two sensor cells are separated from each other at least partly by a medium with a greater specific resistance than the electrically conductive workpieces of the first or second sensor cell, wherein the tactile sensor is covered by a covering and the covering includes at least one seam.

* * * * *

UNITED STATES PATENT AND TRADEMARK OFFICE
CERTIFICATE OF CORRECTION

PATENT NO. : 8,276,467 B2  
APPLICATION NO. : 12/599329  
DATED : October 2, 2012  
INVENTOR(S) : Fritzsche et al.

Page 1 of 1

It is certified that error appears in the above-identified patent and that said Letters Patent is hereby corrected as shown below:

On the Title page, in column 1, under "Inventors (75)", line 1, delete "Magdeburg" and insert --Halle--, therefor.

Signed and Sealed this  
First Day of October, 2013

Teresa Stanek Rea  
*Deputy Director of the United States Patent and Trademark Office*